United States Patent
Kremer et al.

(10) Patent No.: US 8,936,202 B2
(45) Date of Patent: Jan. 20, 2015

(54) HYPER-CONDENSATE RECYCLER

(75) Inventors: Robert Kremer, New York, NY (US); Vladimir V. Fisenko, New York, NY (US); A. Arthur Kressner, Westfield, NJ (US); Joseph Carbonara, Manalapan, NJ (US); Edward Gerard Ecock, Staten Island, NY (US)

(73) Assignees: Consolidated Edison Company of New York, Inc., New York, NY (US); Hudson Fisonic Corporation, New York, NY (US)

( * ) Notice: Subject to any disclaimer, the term of this patent is extended or adjusted under 35 U.S.C. 154(b) by 643 days.

(21) Appl. No.: 13/191,554

(22) Filed: Jul. 27, 2011

(65) Prior Publication Data

US 2012/0248213 A1 Oct. 4, 2012

Related U.S. Application Data

(60) Provisional application No. 61/369,299, filed on Jul. 30, 2010.

(51) Int. Cl.
| | | |
|---|---|---|
| F28D 15/00 | (2006.01) | |
| F24D 10/00 | (2006.01) | |
| F24D 1/00 | (2006.01) | |

(52) U.S. Cl.
CPC ...... *F24D 10/00* (2013.01); *F24D 1/00* (2013.01); Y02E 20/14 (2013.01)
USPC .................................... 236/13; 165/104.13

(58) Field of Classification Search
CPC ......... F24D 1/00; F24D 10/00; F24D 10/003; F24D 2200/13; Y02E 20/14; F04F 5/465
USPC .......................................... 237/13; 165/104.13
See application file for complete search history.

(56) References Cited

U.S. PATENT DOCUMENTS

| | | | | |
|---|---|---|---|---|
| 1,026,399 | A | | 5/1912 | Koerting |
| 1,111,541 | A | | 9/1914 | Koerting |
| 2,556,107 | A | * | 6/1951 | Roswell ........................ 165/278 |
| 2,675,358 | A | | 4/1954 | Fenley, Jr. |
| 3,023,571 | A | * | 3/1962 | Pietrangeli et al. .......... 137/15.1 |

(Continued)

FOREIGN PATENT DOCUMENTS

| | | |
|---|---|---|
| CA | 451981 | 7/1946 |
| CN | 1239194 | 12/1999 |

(Continued)

OTHER PUBLICATIONS

Fisenko, RU 2144145 C1 English machine translation, Jan. 10, 2000.*

(Continued)

*Primary Examiner* — Alissa Tompkins
*Assistant Examiner* — Phillip E Decker
(74) *Attorney, Agent, or Firm* — Cantor Colburn LLP

(57) ABSTRACT

A system for heating a facility is provided. The system includes a first inlet from a district heating system. A heating system is arranged having a condensate outlet. A hyper-condensate recycler is provided having a second inlet coupled to the condensate outlet and a third inlet coupled to the first inlet. The hyper-condensate recycler includes a first outlet. A separator having a fourth inlet is coupled to the first outlet, the separator further having a second outlet fluidly coupled to the first inlet.

8 Claims, 3 Drawing Sheets

(56) References Cited

U.S. PATENT DOCUMENTS

| | | | |
|---|---|---|---|
| 3,045,481 A | 7/1962 | Bunt et al. | |
| 3,074,697 A | 1/1963 | Friedell | |
| 3,200,764 A | 8/1965 | Saunders | |
| 3,277,660 A * | 10/1966 | Kemper et al. | 62/116 |
| 3,401,277 A * | 9/1968 | Larson | 310/11 |
| 3,774,846 A | 11/1973 | Schurig et al. | |
| 3,915,222 A * | 10/1975 | Hull | 165/111 |
| 3,934,799 A * | 1/1976 | Hull | 237/67 |
| 4,509,965 A * | 4/1985 | Morton | 55/399 |
| 4,634,559 A | 1/1987 | Eckert | |
| 5,037,585 A | 8/1991 | Alix et al. | |
| 5,205,648 A | 4/1993 | Fissenko | |
| 5,275,486 A | 1/1994 | Fissenko | |
| 5,307,833 A * | 5/1994 | Stoy et al. | 137/118.04 |
| 5,338,113 A | 8/1994 | Fissenko | |
| 5,544,961 A | 8/1996 | Fuks et al. | |
| 5,931,643 A * | 8/1999 | Skaggs | 417/198 |
| 6,138,456 A * | 10/2000 | Garris | 60/649 |
| 6,427,724 B2 | 8/2002 | Hua | |
| 6,739,288 B1 * | 5/2004 | Kumamoto | 122/15.1 |
| 8,551,222 B2 * | 10/2013 | Fisenko | 95/216 |
| 2012/0116594 A1* | 5/2012 | Aidoun et al. | 700/276 |
| 2012/0186672 A1* | 7/2012 | Fisenko et al. | 137/565.01 |

FOREIGN PATENT DOCUMENTS

| | | | |
|---|---|---|---|
| JP | 2010164235 A | * | 7/2010 |
| RU | 2045715 | | 10/1995 |
| RU | 2061195 | | 5/1996 |
| RU | 2114326 | | 6/1998 |
| RU | 2115027 | | 7/1998 |
| RU | 2127832 | | 3/1999 |
| RU | 2132517 | | 6/1999 |
| RU | 2142604 | | 12/1999 |
| RU | 2144145 C1 | * | 1/2000 |
| RU | 2221935 | | 1/2004 |
| RU | 2263826 | | 11/2005 |
| SU | 532725 A | * | 1/1977 |
| SU | 1290015 | | 2/1987 |

OTHER PUBLICATIONS

Fisenko, RU 2263826 C2 English machine translation, Jan. 27, 2004.*

Oliker, "Use of Fisonic Devices in Con Edison Service Territory, Final Report," New York State Energy Research and Development Authority, No. 11-19, Jan. 2009.*

* cited by examiner

HYPER-CONDENSATE RECYCLER

CROSS REFERENCE TO RELATED APPLICATIONS (IF APPLICABLE)

This application claims priority to U.S. Provisional Application Ser. No. 61/369,299 entitled "Hyper Condensate Recycler" filed on Jul. 30, 2010 the contents of which are incorporated herein in their entirety.

BACKGROUND OF THE INVENTION

The subject matter disclosed herein relates to a device for use in a district steam heating system, and in particular to a device that recycles condensate to reduce consumption by end users and reduce discharges into sewer systems.

In large metropolitan areas, it is not uncommon for a central boiler system to be used to generate heat for multiple facilities in the surrounding area. This heating system is sometimes referred to as district heating. The steam is transported via insulated pipes to subscribing buildings, which purchase the steam from the steam utility. Similar to an electric meter, a steam meter measures the amount of steam used by a particular building and the building owner is charged on a periodic basis.

Some of the facilities that receive steam from the district heating system distribute the steam through the building steam-based space heating system, other facilities convert the steam into hot water in tube and shell heat exchangers. In the latter system, the hot water is then distributed by electrically driven pumps through-out the building for space heating and domestic hot water service. After the steam is utilized in either application, the resulting condensate is typically discharged to the city sewer system. In order to reduce the condensate temperature from 215-220 F. to about 150 F. (a typical city sewer requirement) the condensate is mixed with cold potable water.

The routing of the condensate into the sewer system is a convenient means for disposing of the condensate. However, the facility owner or the district heating system provider is charged a fee based on the amount of waste, including condensate water, that is discharged into the sewer system. Further, since cold water is mixed with the condensate to reduce the temperature, usable energy is wasted and discharge fees are increased.

Accordingly, while existing district heating systems are suitable for their intended purposes a need for improvement remains, particularly in reducing the amount of condensate discharge and in increasing the extraction of energy from the delivered steam.

BRIEF DESCRIPTION OF THE INVENTION

According to one aspect of the invention, a system for heating a facility is provided. The system includes a first inlet from a district heating system. A heating system is provided having a condensate outlet. A hyper-condensate recycler having a second inlet is coupled to the condensate outlet and a third inlet coupled to the first inlet, the hyper-condensate recycler having a first outlet. A separator having a fourth inlet is coupled to the first outlet, the separator further having a second outlet fluidly coupled to the first inlet.

According to another aspect of the invention, a system for recycling condensate within a heating system is provided. The system includes a heat exchanger having a steam inlet and a condensate outlet. A condensate tank is fluidly coupled to the heat exchanger. A hyper-condensate recycler having a first inlet is fluidly coupled to the steam inlet and a second inlet coupled to the condensate tank. A separator is fluidly coupled to receive a fluid output from the hyper-condensate recycler and first outlet fluidly coupled to the steam inlet and a second outlet fluidly coupled to the condensate tank.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide advantages in a condensate recycling device that allows for conversion of the internal energy of heated liquid into useful work. In embodiments of the invention, the heated liquid becomes a two-phase medium and enters a transonic phase, manifesting itself by converting thermal to kinetic energy and harvesting the energy release from the collapsed bubbles to increase the temperature in the outlet flow. This allows heat transfer from a lower temperature stream to a higher temperature stream to become possible. Advantages are gained by highly-efficient direct contact heating, and reducing or eliminating the expenditure of energy (hot water pump) while obtaining useful work. Embodiments of the condensate recycler allow for: the re-introduction of waste condensate into the steam/water mix thereby recovering the latent heat of vaporization of the condensate; the regeneration of steam from the mixed fluid at a desired pressure; reduction or elimination of water use to cool condensate prior to discharge to sewer; and reduction of overall steam consumption by the end users which consequently reduces water discharge to the sewer system.

Figure 1:
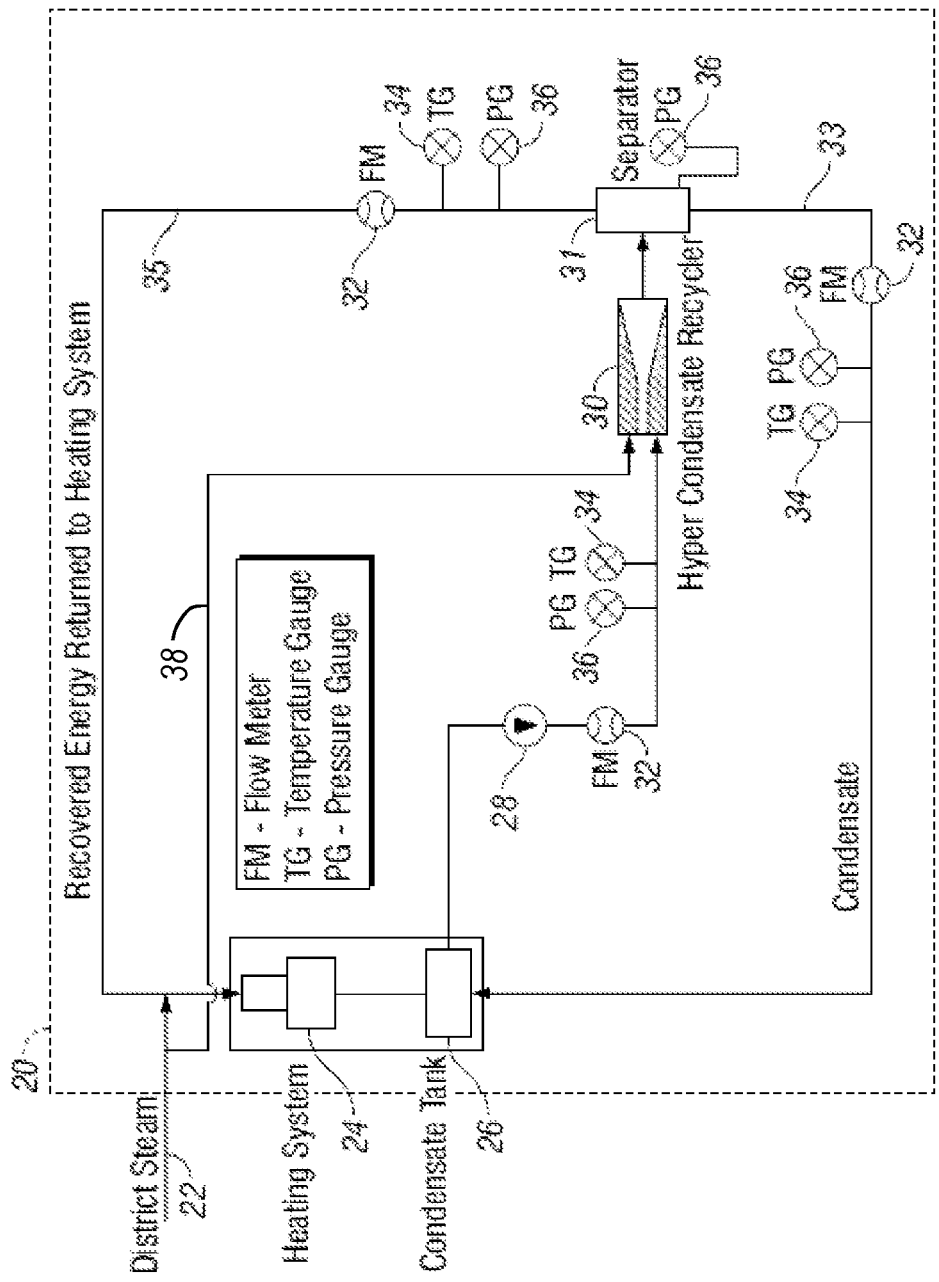
FIG. 1 is a schematic view of a district heating system having a condensate recycling device in accordance with an embodiment of the invention.
Figure 3:
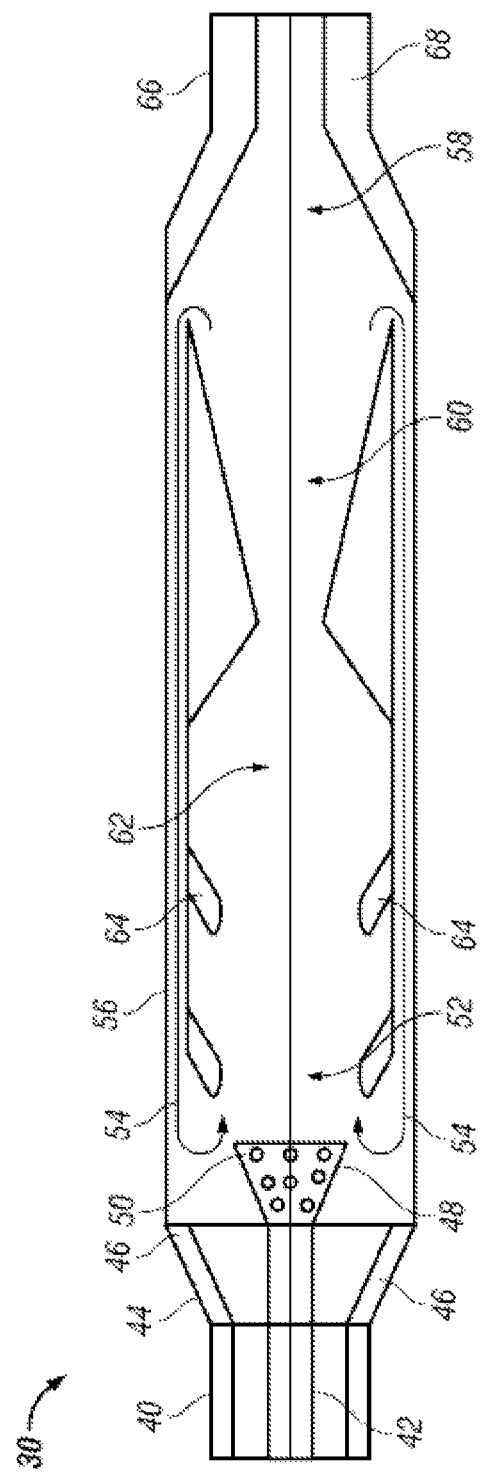
FIG. 3 is a side sectional view of a condensate recycling device for use in the district heating system of FIG. 1 or FIG. 2.

Referring now to FIG. 1 and FIG. 3, a system 20 in an end user facility is provided that receives steam from a district heating system 22. The steam is supplied to a heating system 24 having a heat exchanger that transfers thermal energy from the steam to a building hot water system to the desired temperature. The steam condensate produced in the heating system 24 is collected in a condensate tank 26. From the condensate tank 26, a pump 28 transfers the condensate into the hyper-condensate recycler 30. It should be appreciated that the system 20 may include additional control devices such as but not limited to flow meters 32, temperature gauges 34, pressure gages 36 and valves for example.

In parallel with the condensate from tank 26, the hyper-condensate recycler receives steam from by-pass pipe 38 that is diverted from the incoming steam prior to the heating system 24. The hyper-condensate recycler 30 is shown in FIG. 3 receives liquid condensate via a nozzle 40 and steam from conduit 38 via nozzle 42. The condensate then enters a diffuser 44 having ribs 46 that induce rotational turbulent flow into the condensate flow. Similarly, the steam is directed into a diffuser 48 having multiple de Laval nozzles. In the exemplary embodiment, the concentric orifices 50 in the adjacent rim in lower fluid pressure areas are 8 millimeters in diameter while smaller 3-millimeter diameter orifices are arranged in higher-pressure areas.

From the diffusers 44, the condensate flow enters an open mixing chamber 52 to be induced by de Laval orifices 50 from diffuser 48. In the exemplary embodiment, the length of the mixing chamber 52 is 18-27 millimeters. In the mixing chamber 52, a partial liquid stream 54 is recirculated from an exit nozzle 58 via a concentric conduit 56. The mixed flow is further discharged into a co-axial nozzle that reduces the flow area of the rotational turbulent flow to tangentially compress the mixed flow towards the orifice of a de Laval nozzle 60. A chamber 62 includes ribs 64 that have sharp edges that elevate the Reynolds number and induce turbulence.

A fluid flow then proceeds into the nozzle 58 where the compressed fluid expands. In the exemplary embodiment, the nozzle 58 is 7.5 millimeters from the de Laval nozzle 60 and the nozzle 58 have an angle of 48 degrees. At this point, a partial liquid stream is separated and recirculated into the conical conduit 56. The partial liquid stream flows with a laminar flow through the conduit 56 to create an elevated liquid pressure at the conduit 56 output at chamber 52.

From the nozzle 58, the main liquid stream enters the exit discharge section 66. The discharge section 66 has ribs 68. The ribs 68 induce laminar flow in the exiting fluid. The liquid exiting the hyper-condensate recycler 30 has an increased temperature from the inlet temperature, and an increased pressure from the inlet pressure. In the exemplary embodiment, the inlet temperature of the condensate stream entering the nozzle 40 is between 220-280 Fahrenheit and a pressure between 9-50 psig. The exit temperature at discharge section 66 is 224-285 Fahrenheit and a pressure between 30-150 psig.

The output of the hyper-condensate recycler 30 is transferred to a separator 31. The separator 31 separates liquid condensate and steam from the output of the hyper-condensate recycler 30. The condensate is drained via conduit 33 and transferred back to condensate tank 26. The separated steam is transferred via conduit 35 as recovered energy back to the inlet of heating system 24 where the separated steam is reused for providing thermal energy to the facility. It should be appreciated that this reuse of the separated steam reduces the consumption of steam from the district heating system.

Figure 2:
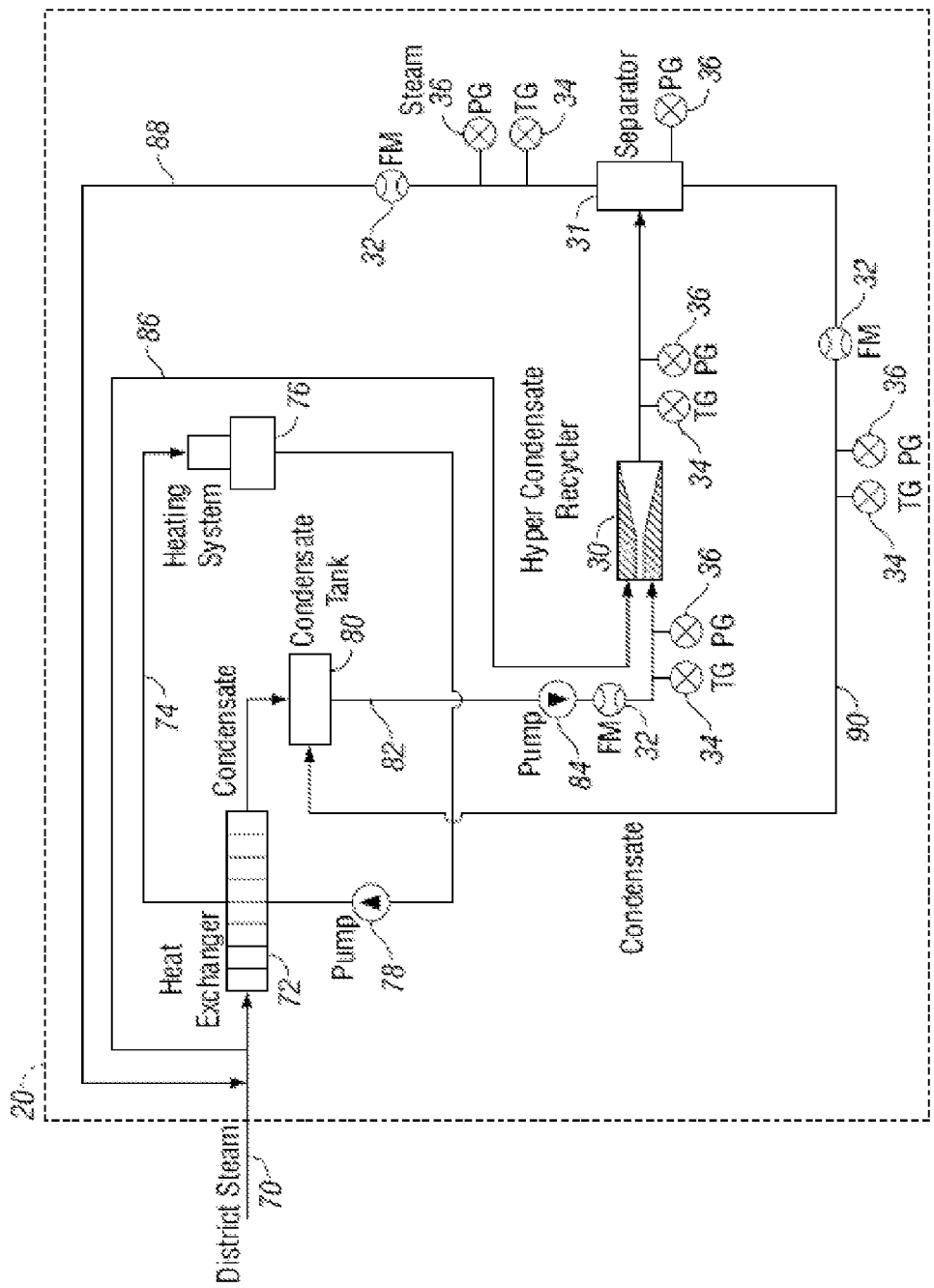
FIG. 2 is a schematic view of a district heating system having a condensate recycling device in accordance with an embodiment of the invention.

Referring now to FIG. 2, another embodiment of the system 20 is shown. In this embodiment, the system 20 receives steam from a district heating system via conduit 70. The steam flows through a heat exchanger 72 that transfers thermal energy to a hot water heating loop 74. The loop 74 is part of a heating system 76 that provides heat to desired locations within the facility. The heating system 76 may include additional control equipment such as pumps 78, valves and gauges as is known in the art.

Once the thermal energy is transferred, the steam condenses and is transferred to a condensate tank 80. The condensate is then flowed via conduit 82 via a pump 84 to the inlet of hyper-condensate recycler 30. The hyper-condensate recycler 30 also receives steam from by-pass pipe 86 that is diverted from the incoming steam from conduit 70 upstream from the heat exchanger 72. The hyper-condensate recycler 30 receives the steam and conduit and operates as described herein above to have an output fluid stream at a higher pressure and temperature than the incoming condensate. The output fluid stream is transferred to a separator 31 to separate condensate from the steam. The steam is transferred via conduit 88 back to conduit 70, while the condensate is transferred from the separator 31 back to the condensate tank 80 via conduit 90.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for heating a facility comprising:
   a first inlet receiving steam from a district heating system;
   a heating system directly coupled to the first inlet, the heating system heating the facility from the steam, the heating system having a condensate outlet;
   a hyper-condensate recycler having a second inlet coupled to the condensate outlet and a third inlet coupled to the first inlet, the hyper-condensate recycler having a first outlet;
   a condensate tank fluidly coupled between the condensate outlet and the second inlet; and,
   a separator having a fourth inlet coupled to the first outlet, the separator further having a second outlet fluidly coupled to the first inlet, the separator further having a third outlet fluidly coupled to the condensate tank, the separator configured to separate the steam from water, wherein no water is removed between the separator and the condensate tank.

2. The system of claim 1 wherein the hyper-condensate recycler further comprises:
   a first nozzle fluidly coupled to the first inlet;
   a first diffuser having multiple de Laval orifices fluidly coupled to the first nozzle;
   a mixing chamber fluidly coupled to the first diffuser and the third inlet;
   a chamber fluidly coupled to the mixing chamber, the chamber having at least one rib configured to elevate a Reynolds number of entering fluid;
   a de Laval nozzle fluidly coupled to the chamber;
   a second nozzle fluidly coupled to the de Laval nozzle; and,
   a discharge section fluidly coupled to the de Laval nozzle.

3. The system of claim 2 wherein the hyper-condensate recycler further comprises:
   a third nozzle fluidly coupled to the first inlet;
   a second diffuser, the second diffuser having ribs that induce rotational turbulent flow into the incoming steam; and,
   a conduit fluidly coupled between the second nozzle and the mixing chamber, the conduit being concentrically disposed about the de Laval nozzle and the mixing chamber.

4. The system of claim 2 wherein the length of the mixing chamber is 18-27 millimeters.

5. The system of claim 3 wherein the multiple de Laval orifices includes a first plurality of orifices having a diameter of 8 millimeters and a second diameter of orifices having a diameter of 3 millimeters.

6. The system of claim 5 wherein the second nozzle is separated from the de Laval nozzle by a distance of 7.5 millimeters.

7. The system of claim 6 wherein the de Laval nozzle and the second nozzle have an included nozzle angle of 48 degrees.

8. The system of claim 1 wherein hyper-condensate recycler receives condensate at a temperature of 220-280 F at a pressure of 9-50 psig and has a fluid temperature of 224-285 F at a pressure of 30-150 psig at the first outlet.

* * * * *